(12) United States Patent
Gao et al.

(10) Patent No.: US 6,690,692 B2
(45) Date of Patent: Feb. 10, 2004

(54) THIRD HARMONIC LASER SYSTEM

(75) Inventors: Yun Feng Gao, Shenzhen (CN); Shao Chen Yang, Shenzhen (CN); Chao Ming Zhou, Shenzhen (CN)

(73) Assignee: Hans Laser Technology Co., Ltd., Shenzhen (CN)

( * ) Notice: Subject to any disclaimer, the term of this patent is extended or adjusted under 35 U.S.C. 154(b) by 0 days.

(21) Appl. No.: 10/208,311

(22) Filed: Jul. 29, 2002

(65) Prior Publication Data

US 2003/0142703 A1 Jul. 31, 2003

(30) Foreign Application Priority Data

Jan. 29, 2002 (CN) ........................................ 02100521 A

(51) Int. Cl.[7] .............................................. H01S 3/10
(52) U.S. Cl. .............................. 372/22; 372/27; 372/28
(58) Field of Search ............................... 372/22, 27, 98, 372/99, 108

(56) References Cited

U.S. PATENT DOCUMENTS

| | | | | |
|---|---|---|---|---|
| 4,200,808 A | * | 4/1980 | Herbst ........................ 359/329 |
| 4,243,881 A | * | 1/1981 | Bethune et al. .......... 250/338.1 |
| 5,144,630 A | | 9/1992 | Lin ............................ 372/22 |
| 5,361,268 A | * | 11/1994 | Fossey et al. ................. 372/23 |
| 5,387,998 A | * | 2/1995 | Kitaoka et al. .............. 359/328 |
| 5,742,626 A | | 4/1998 | Mead et al. .................. 372/22 |
| 5,835,513 A | | 11/1998 | Pieterse et al. ............... 372/22 |
| 5,898,717 A | * | 4/1999 | Yin ............................. 372/22 |
| 5,936,983 A | * | 8/1999 | Yusong et al. ................ 372/22 |
| 5,943,351 A | | 8/1999 | Zhou et al. ................... 372/22 |
| 6,002,695 A | | 12/1999 | Alfrey et al. ................. 372/22 |
| 6,061,370 A | * | 5/2000 | Yin ............................. 372/22 |
| 6,115,402 A | | 9/2000 | Caprara ...................... 372/101 |
| 6,157,663 A | * | 12/2000 | Wu et al. ..................... 372/75 |
| 6,229,829 B1 | * | 5/2001 | Yin ............................. 372/22 |
| 6,241,720 B1 | | 6/2001 | Nishan, Jr. et al. |
| 6,327,281 B1 | * | 12/2001 | Yin ............................. 372/22 |
| 6,347,101 B1 | * | 2/2002 | Wu et al. ..................... 372/18 |
| 6,532,100 B1 | * | 3/2003 | Partanen et al. ............ 359/326 |
| 6,580,054 B1 | * | 6/2003 | Liu et al. ................ 219/121.68 |
| 2002/0008093 A1 | * | 1/2002 | Ukita et al. ............ 219/121.72 |
| 2003/0142703 A1 | * | 7/2003 | Gao et al. .................... 372/21 |

FOREIGN PATENT DOCUMENTS

| | | |
|---|---|---|
| CN | 1058740 A | 2/1992 |
| CN | 2351897 Y | 12/1999 |
| CN | 1285636 A | 2/2001 |
| CN | 1288275 A | 3/2001 |
| CN | 1303011 A | 7/2001 |

* cited by examiner

*Primary Examiner*—Leon Scott, Jt.
(74) *Attorney, Agent, or Firm*—Raymond Y. Chan; David and Raymond Patent Group

(57) ABSTRACT

A third harmonic laser system includes a fundamental wave resonator for generating fundamental laser beam, a second harmonic laser generator for converting fundamental laser beam to a second harmonic laser beam, and a third harmonic laser generator for mixing the second harmonic laser beam with the fundamental laser beam so as to produce a third harmonic laser beam. Multi-pass tripling is used for producing the third harmonic laser beam by means of reflecting and polarizing mirrors, and that the outputted third harmonic laser beam has a high efficiency of about 51% and a high power up to 8.6 W.

20 Claims, 6 Drawing Sheets

THIRD HARMONIC LASER SYSTEM

BACKGROUND OF THE PRESENT INVENTION

1. Field of Invention

The present invention relates to laser, and more particularly to a third harmonic laser system which is capable of generating high third harmonic power with high efficiency.

2. Description of Related Arts

Light Amplification by Simulated Emission of Radiation (Laser) has been widespread all over the world. Thanks to its extremely high brightness and coherency, laser has been found extensive applications in situations which require rapidly delivering of huge amount of energy to a desire position without affecting the nearby objects. Typical examples of utilizing laser for practical purposes include material cutting, especially for cutting extremely hard materials and for the cuttings that require high precision and quality, medical treatment of cancer, and machining of high precision Printed Circuit Board (PCB) etc.

Solid-state laser is highly monochromatic by its nature. Thus, for some specific reasons or extension of its applications, a fundamental laser beam emitted by a high intensity source may have to be raised to second or third harmonic of its frequency, for examples U.S. Pat. Nos. 6,115,402, 5,835,513, 5,742,626, 5,144,630, and China Patent Nos. 130,311 and 1,058,740. In these examples, optical arrangements, each of which usually comprises at least a non-linear medium, are used for generating nth harmonic laser of the frequency of fundamental laser beam. The third harmonic laser is produced by mixing a second harmonic laser and a fundamental laser through the nonlinear medium, such as crystal, in an external laser cavity.

However, such arrangements for raising the frequency of the fundamental laser beam to higher harmonic orders, such as its third harmonic frequency, may fail. In worse, the optical arrangement may even produce unacceptably incoherent or poor quality laser, thus wasting generally expensive equipment and raw material. The reasons for these problems are as follows:

First, since the production of fundamental laser beam depends on spontaneous emission of photon which is essentially a random process, and thus the emission efficiency of the fundamental laser source itself is usually as low as 20% in practice. On the other hand, the conversion efficiency of the emitted fundamental laser beam to the second harmonic laser beam is proportional to the square of the power of the fundamental laser beam. As a result, the overall conversion efficiency is still low.

Second, in order to achieve desirable intensity of the laser beam, in practice, a plurality of optical components is used to converge laser beams so as to obtain higher laser intensity. However, since each laser beam carries a huge amount of energy by itself, the laser beam may even damage the optical components. Once there are defects formed on the lenses, the quality of the resulting converged laser beam will be deteriorated.

Third, mixing the second harmonic laser beam with the fundamental laser beam through the nonlinear medium in the external laser cavity to generate the third harmonic laser beam is usually performed by a single pass tripling process. This leads to huge wastage of uncombined second harmonic and fundamental laser beams.

China Patent No. 1,288,275 utilizes a second harmonic laser multiple mixing chamber to enhance the conversion efficiency of the second harmonic laser beam. However, since the fundamental laser beam produced, as cited in that China patent, is unidirectionally outputted from a fundamental wave resonator, the conversion efficiency of the second harmonic laser beam, though higher, is still far from satisfaction.

Therefore, intra-cavity third harmonic laser generation has been introduced, such as U.S. Pat. Nos. 6,241,720, 6,229,829, 6,002,695, and 5,898,717, and China Patent Nos. 2,351,897 and 1,285,636. In these patents, the third harmonic laser beam is produced by mixing fundamental laser wave with double-pass second harmonic beam once. These techniques are known as single-pass tripling.

However, a significant disadvantage of these single-pass tripling is still high wastage of unconverted second harmonic laser beam since the fundamental laser beam and the second harmonic laser beam only pass through the non-linear medium once.

U.S. Pat. Nos. 5,936,983, and 5,943,351 suggest generating third harmonic laser beam by multi-pass tripling process, i.e. generating third harmonic laser beam by mixing second harmonic laser beam and fundamental laser beam through a non-linear crystal for more than once. Although, through the multi-pass tripling process, the conversion efficiency is enhanced as compared to conventional single pass tripling process, the multi-pass tripling process must generate a number of single-pass tripling third harmonic laser beams which need being reflected to combine into a single outgoing high intensity third harmonic laser beam. These reflections may make the resulting third harmonic laser beam slightly not overlap with each other. As a consequence, there may be more than one third harmonic laser beam emitting from the third harmonic laser system simultaneously. Then, by using such laser for, say, precision drilling, some undesirable holes may be appeared.

Furthermore, it is a natural consequence that the multi-pass tripling process will ultimately impose greater burden to optical components involved as compared with single-pass tripling because the number of times the laser beam passes through the optical components are greater. In view of the above, a high efficiency and high quality third harmonic laser beam therefore is highly demanded.

SUMMARY OF THE PRESENT INVENTION

A main object of the present invention is to provide a third harmonic laser system which is capable of producing efficient and high power third harmonic laser beam.

Another object of the present invention is to provide a third harmonic laser system which substantially increases the overall conversion efficiency as compared with conventional third harmonic laser system, so as to provide highly efficient third harmonic laser beam.

Another object of the present invention is to provide a third harmonic laser system which is capable of producing single and coherent third harmonic laser beam so as to enhance the quality of outputted laser.

Another object of the present invention is to provide a third harmonic laser system which is capable of producing efficient and high intensity third harmonic laser beam without inducing any significant damage to the optical components, especially non-linear crystals, of the laser system. As a result, the laser system can produce high quality third harmonic laser beam.

Accordingly, in order to accomplish the above objects, the present invention provides a third harmonic laser system, comprising:

a fundamental wave resonator which comprises a first laser active medium for generating at least a fundamental laser beam from a front end thereof, wherein the fundamental laser beam has a predetermined fundamental wavelength;

a second harmonic laser generator, which is optically communicated with the fundamental wave resonator and comprises:

a first polarizing mirror, which is highly reflective to the fundamental laser beam, being in optical communication with the fundamental wave resonator and orientated in such a manner that the first polarizing mirror is capable of reflecting the fundamental laser beam with vertical linear polarization generated by the fundamental wave resonator;

a dual wavelength wave-plate which is capable of rotating a portion of second harmonic laser beam with horizontal polarization direction into vertically polarized direction laser beam and allowing an unconverted portion of the horizontally polarized fundamental laser beam to pass through; and a first type-I nonlinear crystal which is optically communicated with the first polarizing mirror and the dual wavelength wave-plate in such a manner that the first type-I nonlinear crystal is capable of converting the fundamental laser beam with vertically polarized direction and reflected from the first polarizing mirror into a horizontally polarized harmonic laser beam which is half of that of the fundamental wavelength while allowing an unconverted portion of the fundamental laser beam to pass through; and a third harmonic laser generator, which is in optical communication with the second harmonic generator and comprises:

a second type-I nonlinear crystal which is capable of mixing and converting a predetermined portion of the fundamental laser beam and the second harmonic laser beam respectively into a horizontally polarized third harmonic laser beam having a third harmonic wavelength which is one-third of the fundamental wavelength, while allowing unconverted fundamental laser beam and second harmonic laser beam to pass through;

a second polarizing mirror, which is anti-reflective to the third harmonic laser beam and highly reflective to the second harmonic laser beam and the fundamental laser beam, optically transmitting horizontally polarized third harmonic laser beam generated by the second nonlinear crystal so as to reflect the second harmonic laser beam and the fundamental laser beam to the second harmonic laser generator; and a third harmonic laser end mirror, which is highly reflective to the fundamental laser beam, the second harmonic laser beam, and the third harmonic laser beam, optically communicated with the second type-I nonlinear crystal for reflecting the fundamental laser beam, the second harmonic laser beam and the third harmonic laser beam to the second polarizing mirror via the second type-I nonlinear crystal, such that the third harmonic laser beam is capable of being outputted by passing through the second polarizing mirror.

DETAILED DESCRIPTION OF THE PREFERRED EMBODIMENT

Figure 1:
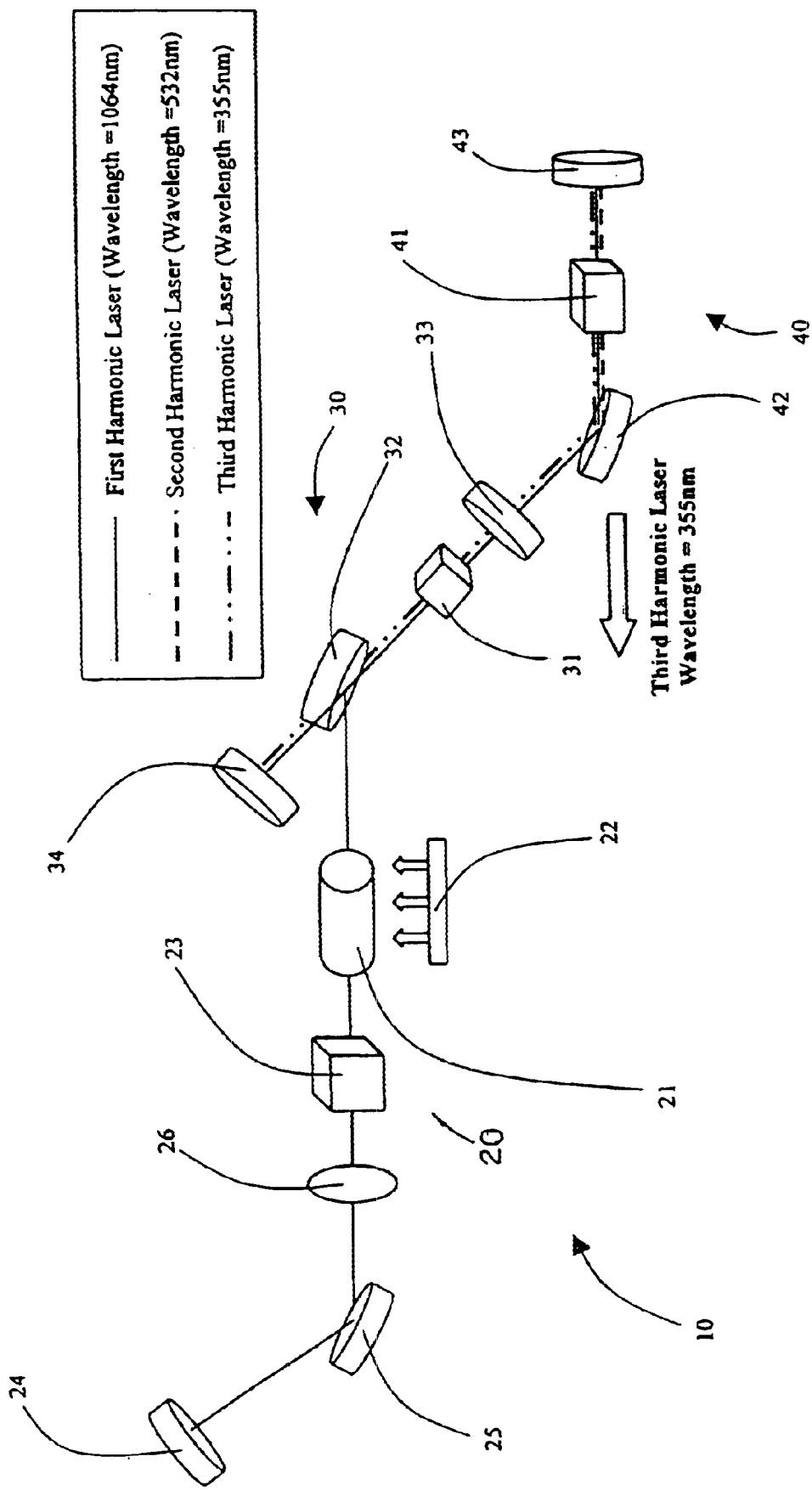
FIG. 1 is a schematic diagram of a third harmonic laser system according to a preferred embodiment of the present invention.

Referring to FIG. 1 of the drawings, a third harmonic laser system 10 according to a preferred embodiment of the present invention is illustrated. According to the first preferred embodiment, the third harmonic laser system 10 comprises a fundamental wave resonator 20 for generating a fundamental laser beam, a second harmonic laser generator 30 communicated with the fundamental wave resonator 10 for generating a second harmonic laser beam, and a third harmonic laser generator 40 for generating a third harmonic laser beam.

The laser produced by the present invention follows definitions of related literatures, wherein the second harmonic laser beam has an electromagnetic radiation wavelength half of the wavelength of the fundamental laser beam thereof, and that the third harmonic laser beam has an electromagnetic radiation wavelength one-third of the fundamental laser beam thereof. In other words, the second harmonic laser beam has a frequency double of the fundamental laser beam thereof and the third harmonic laser beam has a frequency triple of the fundamental laser beam thereof.

The fundamental wave resonator 20 comprises a preferably solid state laser active medium 21 such as Nd:YAG according to the preferred embodiment, a laser pump 22, such as laser diode arrays for energizing the Nd:YAG laser active medium 21, to produce the fundamental laser beam having a wavelength of substantially 1064 nm, and a switch 23 adapted for selectively switching between a pulse laser output and a continuous laser output of the Nd:YAG laser active medium 21.

The second harmonic laser generator 30 comprises a first type-I nonlinear crystal 31 for converting a portion of the fundamental laser beam produced from the fundamental wave resonator 20 into the second harmonic laser beam having a wavelength of substantially 532 nm. According to the preferred embodiment, the first type-I nonlinear crystal is preferably type-I lithium triborate (LBO) crystal.

The third harmonic laser generator 40 comprises a second type-I nonlinear crystal 41 for converting the mixing and converting a portion of the fundamental laser beam produced by the fundamental wave resonator 20 and the second harmonic laser beam generated by the second harmonic laser generator 30 into the third harmonic laser beam having a wavelength of substantially 355 nm. According to the preferred embodiment, the second type-I nonlinear crystal can also be type I lithium triborate (LBO) crystal.

Referring to FIG. 1 of the drawings, the fundamental wave resonator 20 further comprises a fundamental laser end mirror 24 for reflecting fundamental laser beam emitted from the laser active medium 21 toward the second harmonic laser generator 30, and a reflecting polarizing mirror 25 optically communicating the laser active medium 21 and the fundamental laser end mirror 24.

The second harmonic laser generator 30 further comprises a first polarizing mirror 32, which is in optical communication with the first type I nonlinear crystal 31 and the first laser active medium 21, and is orientated in such a manner that an polarizing angle of incident of the fundamental laser beam is obtained. Furthermore, the second harmonic laser generator 30 further comprises a dual wavelength waveplate 33, which is optically communicated with the first type-I nonlinear crystal 31 and the third harmonic laser generator 40, for converting a horizontally polarized laser into a vertically polarized laser, or vice versa, and a second harmonic laser end mirror 34 optically communicated with the first type-I nonlinear crystal 31 via the first polarizing mirror 32.

On the other hand, the third harmonic laser generator 40 further comprises a second polarizing mirror 42 which is in optical communication with the dual wavelength waveplate 33 of the second harmonic modifier 30 and the second type-I nonlinear crystal 41 so as to direct the second harmonic laser beam to the second type-I nonlinear crystal 41. Furthermore, the third harmonic laser generator 40 further comprises a third harmonic laser end mirror 43 which is in optical communication with the second type-I nonlinear crystal 41 for directing and reflecting the third harmonic laser beam generated by the second type-I nonlinear crystal 41 toward the second polarizing mirror 42.

The end mirrors 24, 34, 43 and the polarizing mirrors 25, 32, 42 are made to behave differently for different laser beams of different wavelengths. Such arrangement allows the third harmonic laser system 10 of the present invention to effectively output the third harmonic laser beam only. The optical properties of the end mirrors 24, 34, 43 and the polarizing mirrors 25, 32, 42 are summarized below. Note that HR denotes 'highly reflective' which means the mirror in question is highly reflective to the specified wavelength; and AR denotes 'anti-reflective' which means the mirror in question is anti-reflective to the specified wavelength. In other words, AR means that the specified wavelength is capable of passing through the mirror in question.

| | |
|---|---|
| Fundamental laser end mirror 24: | 1064 nm HR |
| Reflecting polarizing mirror 25: | 1064 nm HR |
| First polarizing mirror 32: | 1064 nm HR & 532 nm AR |
| Second harmonic laser end mirror 34: | 532 nm HR |
| Second polarizing mirror 42: | 1064 nm HR, 532 nm HR & 355 nm AR |
| Third harmonic laser end mirror 43: | 1064 nm HR, 532 nm HR & 355 nm HR |

The fundamental wave resonator 20 further comprises a vertical polarizing filter 26 for vertically polarizing unpolarized fundamental laser beam strike thereon. The dual wavelength waveplate 33 is designed for converting horizontally polarized electromagnetic wave of 532 nm into vertically polarized wave of the same wavelength.

Initially, a fundamental laser beam having a wavelength of 1064 nm is propagated from a front and a back end of the Nd:YAG laser active medium 21 and directed to the first polarizing mirror 32 and the reflecting polarizing mirror 25 respectively. The fundamental laser beam propagated from the back end of the laser active medium 21 is reflected back by the fundamental laser end mirror 24 and amplified by the laser active medium 21. On the other hand, the fundamental laser beam propagated from the front end of the laser active medium 21 strikes on the first polarizing mirror 32 at a Brewster angle so that the reflected wave is vertically polarized toward the first type-I nonlinear crystal 31. Since the first polarizing mirror 32 is made highly reflective to wave of 1064 nm wavelength, almost all of the fundamental laser beam striking the first polarizing mirror 32 should be reflected toward the first type-I nonlinear crystal 31 in a vertically polarized manner.

Then, the vertically polarized wave having a wavelength of 1064 nm from the first polarizing mirror strikes on the first type-I nonlinear crystal 31. The first type-I nonlinear crystal 31 then converts a portion of the vertically polarized fundamental laser beam into a horizontally polarized second harmonic laser beam having a wavelength of 532 nm. The unconverted fundamental laser beam, which is vertically polarized, then passes through the first type-I nonlinear crystal 31 to the dual wavelength waveplate 33 and the second polarizing mirror 42. On the other hand, the horizontally polarized second harmonic laser beam from the first type-I nonlinear crystal 31 then strikes on the dual wavelength waveplate 33 so that the originally horizontally polarized laser beam is converted to be vertically polarized. Since the second polarizing mirror 42 is HR at 1064 nm and 532 nm, after passing through the dual wavelength waveplate 33, the vertically polarized second harmonic laser beam and the fundamental laser beam will both strike on the second polarizing mirror 42 and be substantially reflected towards the second type-I nonlinear crystal 41 by the second polarizing mirror 42.

The second type-I nonlinear crystal 41 mixes a portion of the fundamental laser beam and a large portion of the second harmonic laser beam together to convert them into a horizontally polarized third harmonic laser beam having a wavelength of 355 nm. Finally, the third harmonic laser beam strikes on the third harmonic laser end mirror 43 and reflected back to the second polarizing mirror 42 through the second type-I nonlinear crystal 41 again. And, since the second polarizing mirror 42 is made to be AR at 355 nm wavelength, the third harmonic wave is then capable of passing through the second polarizing mirror 42 and acts as an output.

Note that the unmixed and unconverted fundamental and second harmonic laser beam are then reflected back by the third harmonic laser end mirror 43 to the second polarizing mirror 42, the dual wavelength waveplate 33, the first type-I nonlinear crystal 31 and finally the first polarizing mirror 32. After the fundamental laser beam and the second harmonic laser beam are reflected to the first polarizing mirror 32, they will be respectively reflected back to the fundamental laser end mirror 24 and the second harmonic laser end mirror 34 which then further reflect them back to the first polarizing mirror 32. Finally, the reflected laser beams and the ongoing fundamental laser beam restart the conversion process as described above.

It is important to stress that, by multiple reflections of the laser beams and multi-passing of the second harmonic laser beam and the fundamental laser beam to the second type-I nonlinear crystal 41, the accumulated third harmonic laser beam is of very high intensity. Note also that the polarizations of laser beam are mainly achieved by reflection of an incident laser at polarizing angle, the local damage from the laser to the optical components, such as the mirrors, can be minimized. In other words, the third harmonic laser system 10 of the present invention is capable of delivering a high intensity third harmonic laser beam, and at the same time, minimizing the damage caused by the high intensity of the laser beams.

Figure 2:
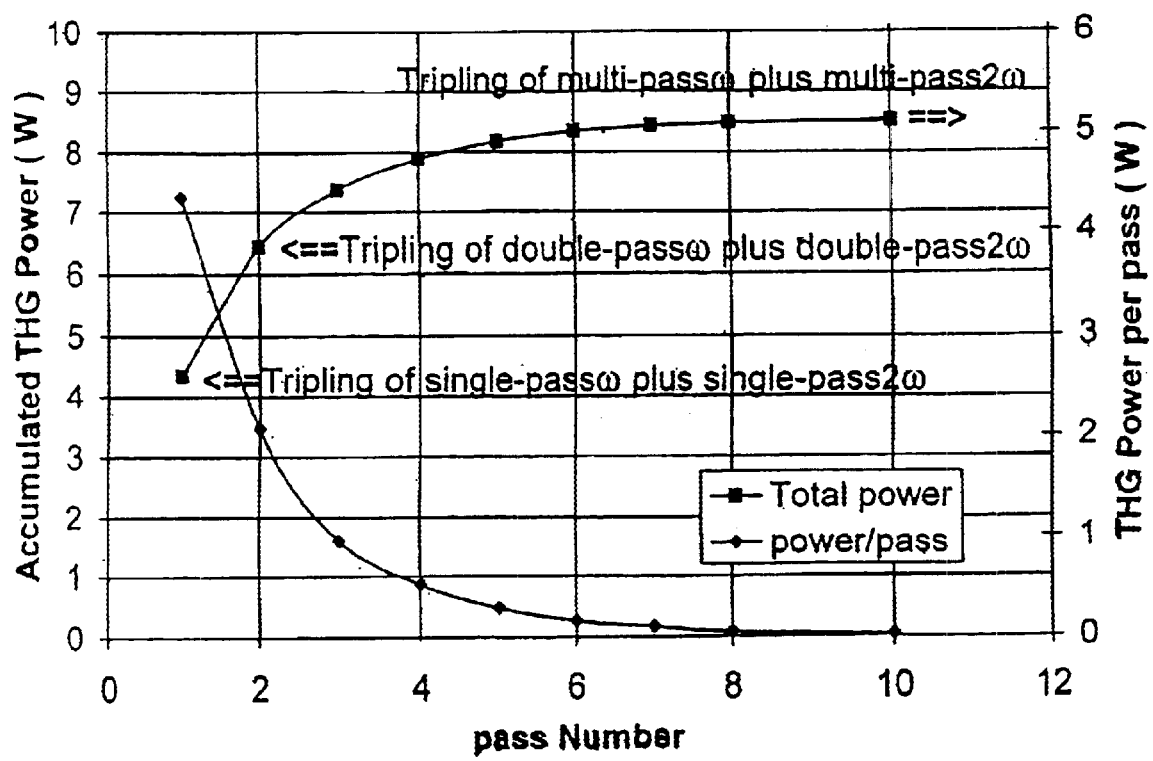
FIG. 2 is a graph showing that the accumulated power and the power per pass of the third harmonic laser beam produced by the third harmonic laser system according to the above preferred embodiment of the present invention.

FIG. 2 of the drawings indicates the accumulated power and the power per pass of the third harmonic laser beam. The powers shown are with respect to the number of passes of the laser beams which pass though the second type-I non-linear crystal 41. As an indication, the conversion efficiency from the fundamental laser beam to the second harmonic laser beam is about 83%, whereas the conversion efficiency from the second harmonic laser beam to the third harmonic laser beam is about 61%. Thus, the overall efficiency is about 51%, which is significantly highly than that of conventional third harmonic laser system. Besides, the output power of the third harmonic laser beam produced by the third harmonic laser system 10 of the present invention is around 8.6 W.

As a further example, an experiment shows that when the laser beam is produced at a frequency of 4–5 kHz, the conversion efficiency from the fundamental laser beam to the second harmonic laser beam can reach 93%, whereas the conversion efficiency of the second harmonic laser beam to the third harmonic laser beam can reach 71%.

Moreover, when the laser beam is produced at a frequency of 7–8 kHz, the power of the outputted third harmonic laser beam is around 8.6 W having pulse width equal to 56 ns. On the other hand, the outputted laser beam has a beam diameter of 0.8 mm with 1.1 mrad laser diverted angle, long time operation power fluctuation of 5% (24 hrs), and long time operation pulse amplitude fluctuation of 7%/p—p.

Figure 3:
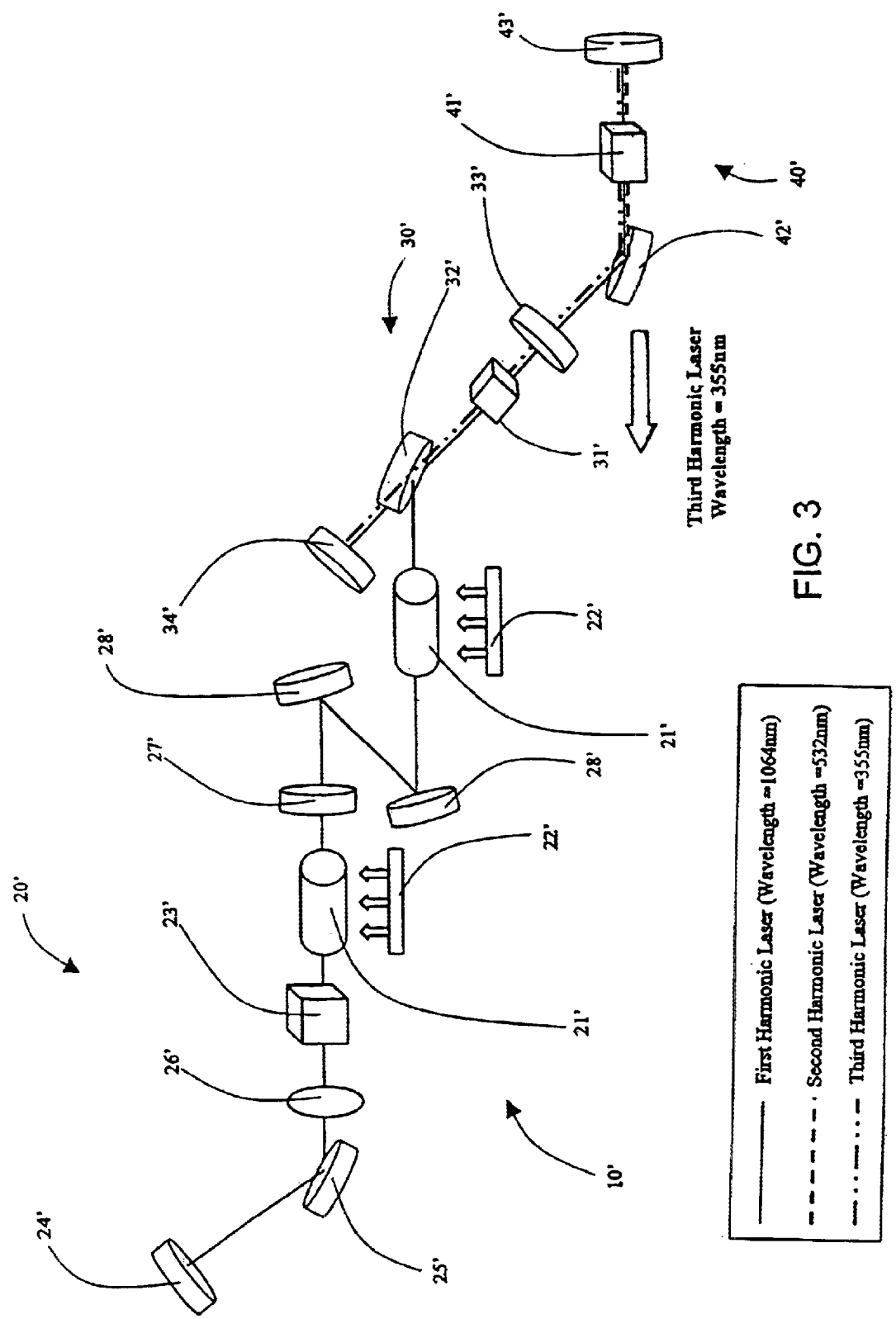
FIG. 3 is a schematic diagram of a first alternative mode of the third harmonic laser system according to the above preferred embodiment of the present invention.

Referring to FIG. 3 of the drawings, a first alternative mode of the third harmonic laser system 10' according to the present invention is illustrated, which also produces a third harmonic laser beam with higher intensity without damaging the optical components, wherein the fundamental wave resonator 20' can further comprises a second Nd:YAG laser active medium 21', a second laser pump 22', a half-dual wavelength waveplate 27' and a pair of guiding mirrors 28' optically communicated with the second fundamental wave resonator 20' in such a manner that the fundamental laser beam generated by the two laser active media 21' will strike on the two guiding mirrors 28' at their polarizing angle respectively. In other words, the fundamental laser beam striking the two guiding mirrors 28' will then be polarized and reflected.

As shown in FIG. 3 of the drawings, the fundamental laser beams coming out from the first and the second laser active medium 21' are arranged to be vertically and horizontally polarized by the two guiding mirrors 28' respectively. After that, one of the polarized beams passes through the half-dual wavelength waveplate 27' so that the two fundamental laser beams are destructively interfered with each other. As a result, the transverse components of the two fundamental laser beams are cancelled out. Such an arrangement allows the third harmonic laser system 10' to deliver high intensity third harmonic laser beam without inducing damaging heating effect to the optical components of the third harmonic laser system 10'.

Finally, the fundamental wave resonator 20' further comprises a second polarizing filter 26' for vertically polarizing the first fundamental laser beam emitted from the second laser active medium 21'.

With the arrangement of the first alternative mode of the present invention, the output power of the third harmonic laser beam is around 18 W. As a matter of choice, the laser active medium 21' can also be replaced by Nd:YLF, Nd:Glass, Yb:YAG, Er:YAG or Nd:YVO$_4$ from the original Nd:YAG.

Figure 4:
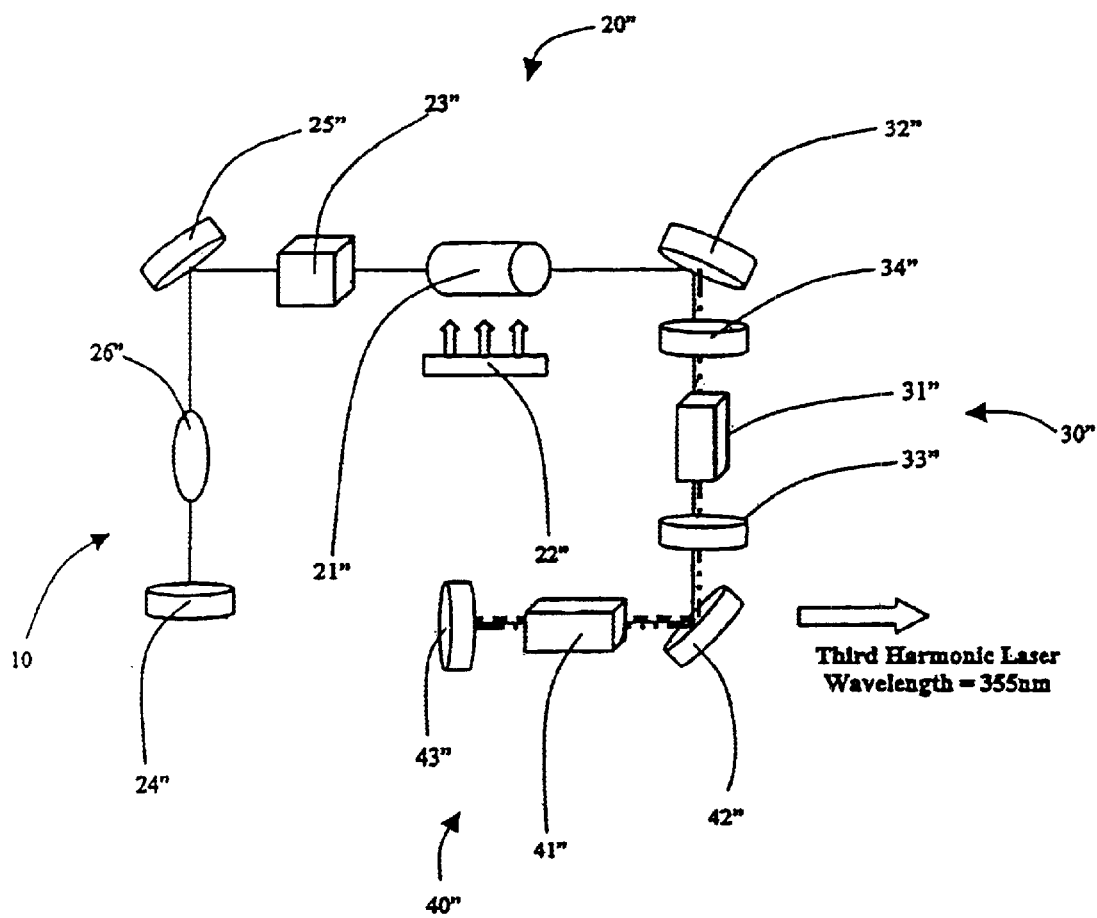
FIG. 4 is a schematic diagram of a second alternative mode of the third harmonic laser system according to the above preferred embodiment of the present invention.
Figure 5:
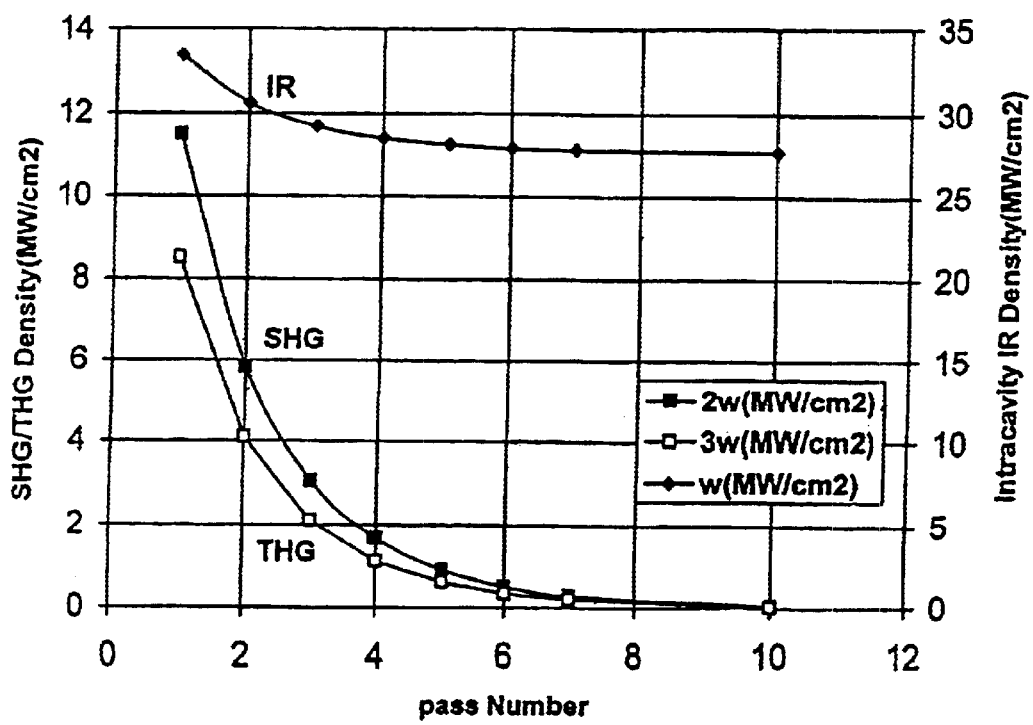
FIG. 5 is a graph illustrating that the power density of the laser beams according to the second alternative mode of the above preferred embodiment of the present invention.
Figure 6:
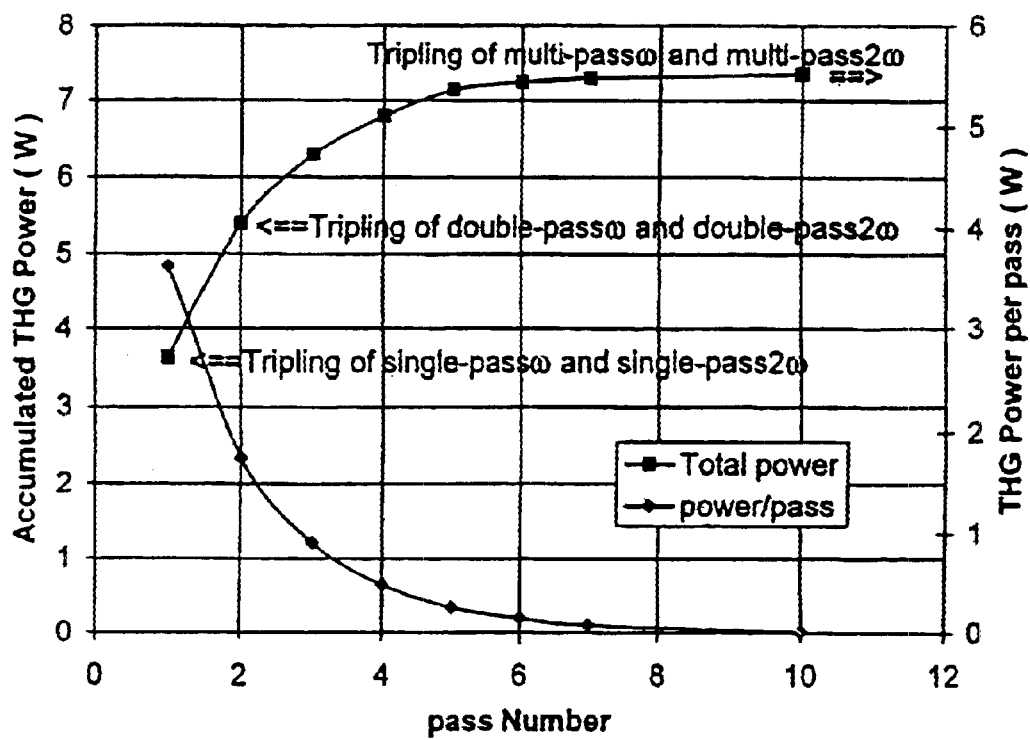
FIG. 6 is a graph illustrating that the power of the third harmonic laser beam according to the second alternative mode of the above preferred embodiment of the present invention.

Referring to FIGS. 4 to 6 of the drawings, in order to further minimize the physical size of the third harmonic laser system 10'' of the present invention, the reflecting mirrors 25 and the first and second polarizing mirrors 32, 42 can be orientated in such a manner that the incident angle of the laser beams to these mirrors are about 45 degrees respectively which are slightly smaller than the polarizing angle. Though the output power will be slightly reduced as compared with the above preferred embodiment, the overall size of the third harmonic laser system 10'' will become more compact. As an illustration, as shown in FIGS. 5 to 6 of the drawings, the power of the outputted third harmonic laser beam is around 7.4 W.

What is claimed is:

1. A third harmonic laser system, comprising:

a fundamental wave resonator which comprises a first laser active medium generating at least a fundamental laser beam from a front end mirror thereof, wherein said fundamental laser beam has a fundamental wavelength;

a second harmonic laser generator, which is optically communicated with said fundamental wave resonator, comprising:

a first polarizing mirror, which is reflective to said fundamental laser beam, being in optical communication with said fundamental wave resonator and orientated in such a manner that when said fundamental laser beam generated by said fundamental wave resonator strikes on said first polarizing mirror at a predetermined angle, said fundamental laser beam is vertically polarized and reflected;

a dual wavelength waveplate, which is capable of converting horizontally polarized laser beam into vertically polarized laser beam; and a first type-I nonlinear crystal optically communicating said first polarizing mirror with said dual wavelength waveplate and converting said fundamental laser beam which is vertically polarized and reflected from said first polarizing mirror into a horizontally polarized second harmonic laser beam having a second harmonic wavelength which is half of said fundamental wavelength while allowing a first unconverted portion of said fundamental laser beam to pass through; and a third harmonic laser generator, which is in optical communication with said second harmonic modifier, comprising:

a second type-I nonlinear crystal mixing and converting a predetermined portion of said fundamental laser beam and said second harmonic laser beam into a horizontally polarized third harmonic laser beam having a third harmonic wavelength which is one-third of said fundamental wavelength, while allowing a second unconverted portion of said fundamental laser beam and said second harmonic laser beam to pass through, wherein said second harmonic laser has a property of horizontal linear polarization;

a second polarizing mirror, which is anti-reflective to said third harmonic laser beam and reflective to said second harmonic laser beam and said fundamental laser beam, optically communicating said second type-I nonlinear crystal with said dual wavelength waveplate so as to reflect said second harmonic laser beam and said fundamental laser beam to said second harmonic laser generator; and a third harmonic laser end mirror, which is reflective to said fundamental laser beam, said second harmonic laser beam and said third harmonic laser beam, being optically communicated with said second type-I nonlinear crystal to reflect said fundamental laser beam, said second harmonic laser beam and said third harmonic laser beam to said second polarizing mirror via said second type-I nonlinear crystal, wherein said third harmonic laser beam is outputted by passing through said second polarizing mirror.

2. The third harmonic laser system, as recited in claim 1, wherein said first polarizing mirror is anti-reflective to said second harmonic laser beam and said second harmonic laser generator further comprises a second harmonic laser end mirror, which is reflective to said second harmonic laser beam, being optically communicated with said first polarizing mirror, wherein said second harmonic laser end mirror reflects said second harmonic laser beam toward said third harmonic laser generator via said first polarizing mirror, said first type-I nonlinear crystal and said dual wavelength waveplate.

3. The third harmonic laser system, as recited in claim 2, wherein said first laser active medium emits a second fundamental laser beam from an back end thereof, wherein said fundamental wave resonator further comprises a fundamental laser end mirror, which is reflective to said fundamental laser beams, being in optical communication with said first laser active medium, wherein said second fundamental laser beam is reflected by said fundamental laser end mirror toward said second harmonic laser generator.

4. The third harmonic laser system, as recited in claim 3, wherein said fundamental wave resonator further comprises a polarizing filter optically communicated said first laser active medium for vertically polarizing said fundamental laser beams and a reflecting polarizing mirror which optically communicates said polarizing filter with said fundamental laser end mirror.

5. The third harmonic laser system, as recited in claim 4, wherein said type-I nonlinear crystals are type-I lithium triborate (LBO) crystals.

6. The third harmonic laser system, as recited in claim 4, wherein said first laser active medium is Nd:YAG.

7. The third harmonic laser system, as recited in claim 4, wherein said first laser active medium is Nd:YLF.

8. The third harmonic laser system, as recited in claim 4, wherein said first laser active medium is Nd:YVO$_4$.

9. The third harmonic laser system, as recited in claim 4, wherein said first laser active medium is Nd:glass.

10. The third harmonic laser system, as recited in claim 4, wherein said fundamental wave resonator further comprises a second laser active medium, which is capable of emitting second fundamental laser beams from a front and a back end thereof, optically communicating said first laser active medium with said second harmonic laser generator, a first guiding mirror optically communicated with said first laser active medium that said first fundamental laser beam is polarized by said first laser active medium, a second guiding mirror optically communicated with said second laser medium that said first fundamental laser beam is polarized by said second guiding mirror, and a half-dual wavelength waveplate optically communicating said first laser active medium and said first guiding mirror.

11. The third harmonic laser system, as recited in claim 10, wherein said type-I nonlinear crystals are type I lithium triborate (LBO) crystals.

12. The third harmonic laser system, as recited in claim 10, wherein said second laser active medium is Nd:YAG.

13. The third harmonic laser system, as recited in claim 10, wherein said second laser active medium is Nd:YLF.

14. The third harmonic laser system, as recited in claim 10, wherein said second laser active medium is Nd:YVO$_4$.

15. The third harmonic laser system, as recited in claim 10, wherein said second laser active medium is Nd:glass.

16. The third harmonic laser system, as recited in claim 4, wherein said reflecting polarizing mirror, said first polarizing mirror and said second polarizing mirror have an angle of incident of 45 degrees of said laser beams.

17. The third harmonic laser system, as recited in claim 16, wherein said type-I nonlinear crystals are type I lithium triborate (LBO) crystals.

18. The third harmonic laser system, as recited in claim 16, wherein said first laser active medium is Nd:YAG.

19. The third harmonic laser system, as recited in claim 16, wherein said first laser active medium is Nd:YLF.

20. The third harmonic laser system, as recited in claim 16, wherein said first laser active medium is Nd:YVO$_4$.

* * * * *